US010112128B2

(12) United States Patent
Berkebile et al.

(10) Patent No.: US 10,112,128 B2
(45) Date of Patent: Oct. 30, 2018

(54) APPARATUS FOR SECURING UNDERDRAIN FILTER BLOCK

(71) Applicant: Xylem Water Solutions Zelienople LLC, Zelienople, PA (US)

(72) Inventors: Dean T. Berkebile, Cranberry Township, PA (US); Christopher J. Ball, Cranberry Township, PA (US); Daniel E. Bruce, Murrysville, PA (US)

(73) Assignee: Xylem Water Solutions Zelienople LLC, Zelienople, PA (US)

( * ) Notice: Subject to any disclaimer, the term of this patent is extended or adjusted under 35 U.S.C. 154(b) by 315 days.

(21) Appl. No.: 14/722,553

(22) Filed: May 27, 2015

(65) Prior Publication Data

US 2015/0343335 A1 Dec. 3, 2015

Related U.S. Application Data

(60) Division of application No. 13/522,748, filed as application No. PCT/US2011/021522 on Jan. 18, 2011, now Pat. No. 9,072,990, which is a continuation-in-part of application No. 12/983,465, filed on Jan. 3, 2011, now Pat. No. 8,889,003.

(60) Provisional application No. 61/295,891, filed on Jan. 18, 2010.

(51) Int. Cl.
*B01D 24/24* (2006.01)
*B01D 24/46* (2006.01)
*B01D 24/00* (2006.01)
*B01D 24/02* (2006.01)

(52) U.S. Cl.
CPC ....... *B01D 24/4631* (2013.01); *B01D 24/001* (2013.01); *B01D 24/02* (2013.01); *B01D 24/24* (2013.01); *Y10T 29/49826* (2015.01); *Y10T 29/49828* (2015.01)

(58) Field of Classification Search
CPC ...... B01D 24/001; B01D 24/02; B01D 24/24; B01D 24/4631
See application file for complete search history.

(56) References Cited

U.S. PATENT DOCUMENTS

| 2,378,239 A | 6/1945 | Myron |
| 2,873,857 A | 2/1959 | Scheid |
| 3,110,667 A | 11/1963 | Stuppy |
| 3,615,019 A | 10/1971 | Early, Jr. |
| 3,762,559 A | 10/1973 | Knoy et al. |

(Continued)

FOREIGN PATENT DOCUMENTS

| CN | 2145060 Y | 11/1993 |
| JP | 5235441 | 3/1977 |

(Continued)

*Primary Examiner* — Matthew O Savage
(74) *Attorney, Agent, or Firm* — The Webb Law Firm

(57) ABSTRACT

An underdrain filter block for use in draining and backwashing a filtering media in a filter bed including a top wall, a pair of side walls extending from the top wall, a bottom wall extending between the pair of side walls, and a transverse wall extending from one of the pair of side walls to the other of the pair of side walls. The top wall, the pair of side walls, and the bottom wall define an upper portion and a lower portion. The lower portion includes a grout chamber positioned between the bottom wall and the transverse wall and at least one of the bottom wall and said side walls contains an opening.

9 Claims, 8 Drawing Sheets

(56) References Cited

U.S. PATENT DOCUMENTS

| | | | |
|---|---|---|---|
| 3,956,134 A | 5/1976 | Sturgill | |
| 4,065,391 A | 12/1977 | Farabaugh | |
| 4,331,542 A | 5/1982 | Emrie | |
| 4,619,765 A | 10/1986 | Roberts | |
| 5,019,259 A | 5/1991 | Hambley | |
| 5,030,343 A | 7/1991 | Urriola | |
| 5,108,627 A | 4/1992 | Berkebile et al. | |
| 5,149,427 A | 9/1992 | Brown et al. | |
| 5,160,614 A | 11/1992 | Brown | |
| 5,489,388 A | 2/1996 | Brown et al. | |
| 6,090,284 A | 7/2000 | Melber et al. | |
| 6,110,366 A | 8/2000 | Hunkele et al. | |
| 6,143,188 A | 11/2000 | Jantsch, Sr. et al. | |
| 6,306,310 B1 | 10/2001 | Bergmann et al. | |
| 6,740,237 B1 | 5/2004 | Roberts et al. | |
| 8,889,003 B2 * | 11/2014 | Berkebile | B01D 24/24 210/232 |
| 9,072,990 B2 * | 7/2015 | Berkebile | B01D 24/24 |
| 9,480,939 B2 * | 11/2016 | Ball | B01D 35/02 |
| 9,764,259 B2 * | 9/2017 | Geibel | B01D 24/24 |
| 2007/0190865 A1 | 8/2007 | Slack et al. | |
| 2008/0000825 A1 | 1/2008 | Roberts et al. | |

FOREIGN PATENT DOCUMENTS

| | | | |
|---|---|---|---|
| JP | 4326905 A | 11/1992 | |
| JP | 5277306 A | 10/1993 | |
| JP | 3072682 U | 8/2000 | |
| JP | 2009226246 A | 10/2009 | |
| JP | 2010234343 A | 10/2010 | |
| KR | 200398755 Y1 | 10/2005 | |
| WO | 9527549 A1 | 10/1995 | |

\* cited by examiner

APPARATUS FOR SECURING UNDERDRAIN FILTER BLOCK

CROSS-REFERENCE TO RELATED APPLICATION

This application is a divisional of U.S. application Ser. No. 13/522,748, which is a § 371 national stage of International Application No. PCT/US2011/021522 filed on Jan. 18, 2011 and a continuation-in-part of U.S. application Ser. No. 12/983,465, filed Jan. 3, 2011, claiming the benefit of U.S. Provisional Application No. 61/295,891, filed Jan. 18, 2010. The entire content of the above-referenced applications is hereby incorporated by reference.

BACKGROUND OF THE INVENTION

Field of the Invention

The present invention relates to an underdrain filter block and, more particularly, to a filter block used in draining and backwashing a filtering media in a filter bed and a method of securing the filter block to the filter floor.

Description of Related Art

Underdrain filter blocks provide a filter bottom by assembling a number of filter blocks together to provide an upper surface for supporting a filter media. The filter bottom upper surface is provided with openings to allow the flow of filtered liquid from the filter media to pass into the filter bottom where conduits carry the filtered liquid from the filter. The conduits also serve to provide backwashing fluids, such as gas or liquid or both, to the filter media for cleaning. U.S. Pat. No. 5,108,627 to Berkebile et al. discloses a filter underdrain block and is hereby incorporated by reference in its entirety.

Generally, conventional underdrain filter blocks are susceptible to uplift failure due to an internal pressure caused by headloss through the underdrain. The headloss or internal pressure of the conventional underdrain blocks tends to force the block off the filter floor as a bottom section of the underdrain block deflects or deforms from internal pressure.

U.S. Pat. No. 3,956,134 to Sturgill discloses, as shown in FIGS. 5, 6, and 13, an underdrain unit with a bottom wall that extends outwardly beyond sidewalls to define a flange. Perforations in the bottom wall help to secure the underdrain to the floor of the filter basin by engaging with grouting material provided under the underdrain units. Referring to FIG. 6, an end wall of the filter unit is provided with a plurality of perforations that provide mechanical engagement with grouting material provided around the units.

U.S. Pat. No. 6,110,366 to Hunkele et al. discloses an anchor concept for securing an underdrain block to a filter floor. In particular, Hunkele discloses the use of anchors that comprise one or more widenings extending outwardly from a rib so as to form ledges that are embedded in grouting on a filter floor.

U.S. Pat. No. 3,110,667 to Stuppy and U.S. Pat. No. 4,619,765 to Roberts disclose filter block constructions in which a bottom wall of the filter block is defined with ridges or grooves.

SUMMARY OF THE INVENTION

In one embodiment, an underdrain filter block for use in draining and backwashing a filtering media in a filter bed includes a top wall, a pair of side walls extending from the top wall, a bottom wall extending between the pair of side walls, and a transverse wall extending from one of the pair of side walls to the other of the pair of side walls. The top wall, the pair of side walls, and the bottom wall define an upper portion and a lower portion. The lower portion includes a grout chamber positioned between the bottom wall and the transverse wall and at least one of the bottom wall and one of the pair of side walls contains an opening.

The bottom wall and the pair of side walls may define a plurality of openings in the lower portion. The upper portion may include a primary chamber and at least one secondary chamber defined by a pair of angularly extending walls. The top wall, the transverse wall, and a portion of said side walls may comprise a first piece, and the bottom wall and a portion of said side walls may comprise a second piece, where the first piece is secured to the second piece. The underdrain filter block may further include a plurality of ribs generally extending circumferentially along the pair of side walls and the bottom wall. The grout chamber may extend the full length of the underdrain filter block or may only extend a portion of the full length of the underdrain filter block. The grout chamber may be recessed inwardly relative to an outermost portion of the side walls. The upper portion may include a primary chamber and at least one secondary chamber defined by an arched wall. The plurality of openings may be circular-shaped.

In a further embodiment, an underdrain filter block for use in draining and backwashing a filtering media in a filter bed includes a top wall, a pair of side walls extending from the top wall, and a bottom wall extending between the pair of side walls. The top wall, the pair of side walls, and the bottom wall define an upper portion and a lower portion. The lower portion includes a plurality of grout chambers defined by a grid-like structure positioned on a bottom surface of the bottom wall. The bottom surface of the block contains a plurality of air relief openings that extend into each of the plurality of grout chambers.

In another embodiment, an underdrain filter block for use in draining and backwashing a filtering media in a filter bed includes a top wall, a pair of side walls extending from the top wall, a bottom wall extending between the pair of side walls, a plurality of ribs extending circumferentially along the pair of side walls and the bottom wall, and a plurality of wall segments extending between the plurality of ribs to define a plurality of grout chambers. The plurality of grout chambers may be positioned below the bottom wall. The plurality of wall segments may each define a plurality of openings. The underdrain filter block may further include a primary chamber and at least one second chamber defined by an arched wall.

In a further embodiment, a method of installing an underdrain filter block includes positioning an underdrain filter block adjacent to a filter floor. The underdrain filter block has a top wall, a pair of side walls extending from the top wall, a bottom wall extending between the pair of side walls, and a transverse wall extending from one of the pair of side to the other of the pair of side walls. The underdrain filter block also including a grout chamber positioned between the bottom wall and the transverse wall. The grout chamber includes at least one opening defined by at least one of the bottom wall and one of the pair of side walls. The method further includes providing grout along the pair of side walls and the bottom wall such that grout extends into the at least one opening.

The grout may be provided along the bottom wall of the block by positioning a section of leveling grout on the filter floor. A plurality of openings may be defined by the bottom wall and the pair of side walls of the block with the openings in the bottom wall and the pair of side walls each receiving grout. The underdrain filter block may be positioned onto the section of leveling grout on the filter floor. The grout may be provided along the pair of side walls of the underdrain filter block after positioning the underdrain filter block onto the section of leveling grout.

In yet another embodiment, a method of assembling an underdrain filter block includes providing a first piece including a top wall, a pair of side walls extending from the top wall, and a bottom wall extending between the pair of side walls. The method further includes providing a second piece that defines interior walls, inserting the second piece into the first piece, and securing the first piece to the second piece.

The interior walls of the second piece may include a transverse wall and an arched wall. The method may further include engaging grooves defined by the side walls of the first piece with the transverse wall of the second piece. The method may also include spacing the transverse wall of the second piece from the bottom wall of the first piece.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
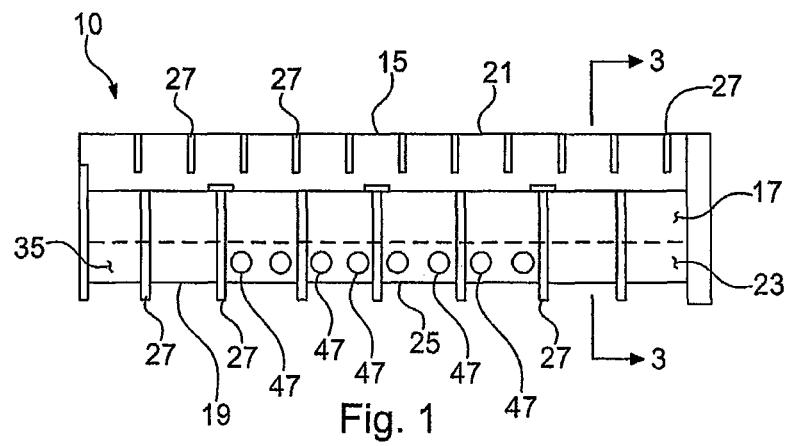
FIG. 1 is a front view of an underdrain filter block according to one embodiment of the present invention.
Figure 2:
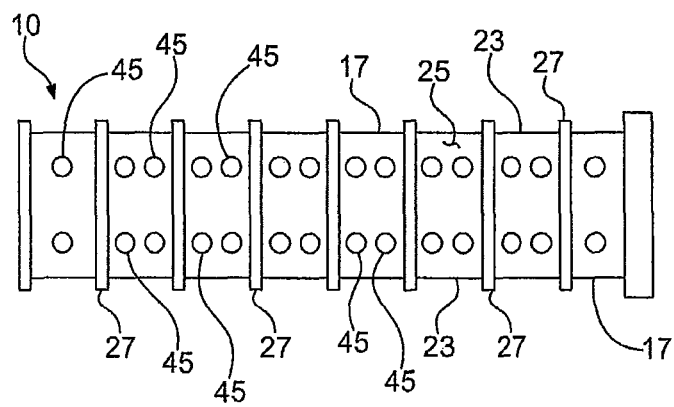
FIG. 2 is a bottom view of the filter block of FIG. 1.
Figure 3:
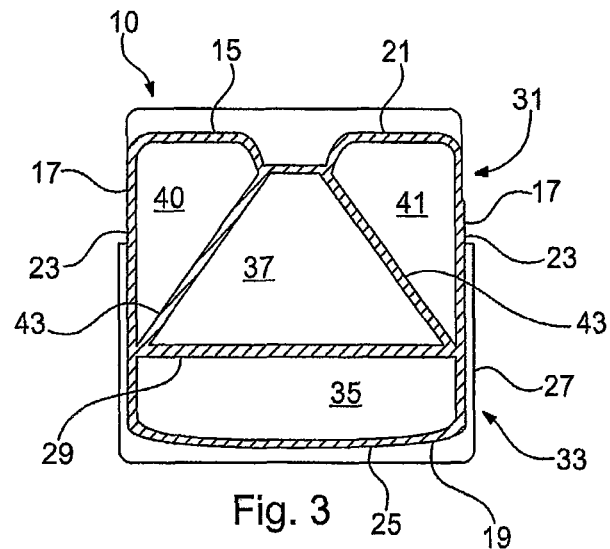
FIG. 3 is an enlarged cross-sectional view of the filter block along the line 3-3 shown in FIG. 1.

Referring to FIGS. 1-3, one embodiment of an underdrain filter block 10 includes a top wall 15, a pair of side walls 17, and a bottom wall 19, which define a top surface 21, side surfaces 23, and a bottom surface 25, respectively. The block 10 includes a plurality of reinforcing ribs 27 on the exterior surface of the walls 15, 17, 19. The ribs 27 are generally oriented circumferentially around the block 10 rather than along a longitudinal axis of the block, although other rib orientations and configurations may be utilized. The ribs 27 on the top wall 15 are separate or discontinuous from the ribs positioned on the bottom wall 19, although a single rib that extends circumferentially around the block 10 may be utilized. As shown in FIG. 3, a transverse interior wall 29 extends from one side wall 17 to the other side wall 17 to divide the interior of block 10 into an upper portion 31 and a lower portion 33. The top wall 15 defines a recessed portion that extends along a longitudinal axis of the block 10. The side walls 17 are generally planar, although the side walls may include recessed portions such that the width of the block 10 in cross-section is narrower in certain areas. The ends of the block 10 are configured to receive respective ends of adjacent blocks so that a plurality of underdrain filter blocks may be secured end-to-end.

The lower portion 33 of the block 10 includes a grout chamber 35 defined by the transverse wall 29, side walls 17, and bottom wall 19. The grout chamber 35 is open at each end of the block 10, although the chamber 35 may be closed at one or both ends. The grout chamber 35 extends longitudinally along the full length of the block 10, although the chamber 35 may have a length shorter than the full length of the block 10. The upper portion 31 of the block 10 includes a primary chamber 37 and a pair of secondary chambers 40, 41 defined by a pair of angularly extending walls 43. Rather than providing the substantially planar angularly extending walls 43, the interior walls that define the primary chamber 37 and the secondary chambers 40, 41 may be arched or curved such as those shown, for example, in FIGS. 6 and 7 discussed below. The top wall 15 and the angularly extending walls 43 define a plurality of orifices (not shown) to provide for the distribution of liquid and gas as known in conventional underdrain filter blocks.

The bottom wall 19 of the filter block 10 defines a plurality of openings 45 that extend into the grout chamber 35. Each of the side walls 17 also define a plurality of openings 47 in the lower portion 33 of the block 10 with the openings 47 extending into the grout chamber 35. The openings 47 in the side walls 17 are not provided for the full length of the block 10, but may be provided for the full length of the block 10 in other configurations. Although the side walls 17 and bottom wall 19 include openings 45, 47, the side walls 17 or bottom wall 19 may alternatively not include openings. Further, the side walls 17 and the bottom wall 19 may not be provided with openings that extend into the grout chamber 35. In such an arrangement, the block 10 may be provided with a grout introduction scoop (not shown) that is in fluid communication with the grout chamber 35. Furthermore, the openings 45, 47 are substantially circular-shaped, but may have other configurations such as being oblong-shaped, square-shaped, or any other suitable shape. The grout chamber 35 may be formed integrally with the block 10 to define a unitary, one-piece construction. The grout chamber 35 may also be formed from multiple pieces. In particular, the grout chamber 35 may be formed separately and secured to the rest of the block 10 through a fastening arrangement, such as by bolts or welding.

Figure 4:
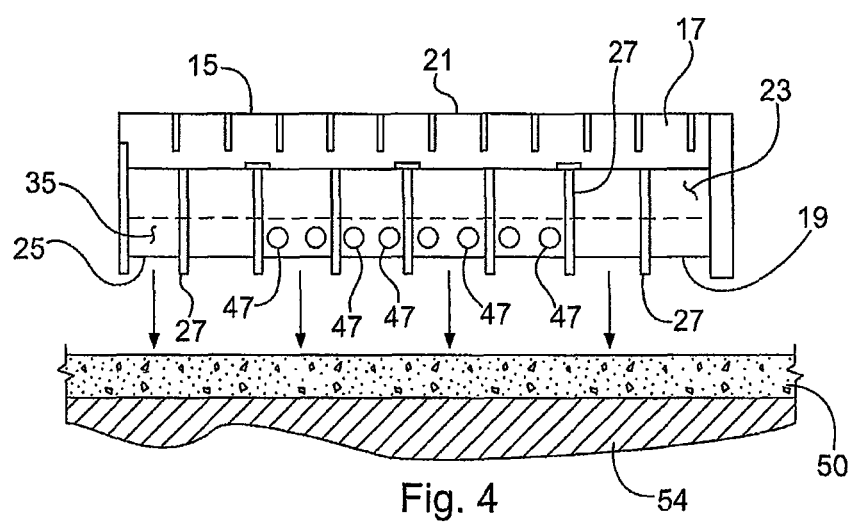
FIG. 4 is a front view of the filter block of FIG. 1, showing the filter block being laid on the base grout.
Figure 5:
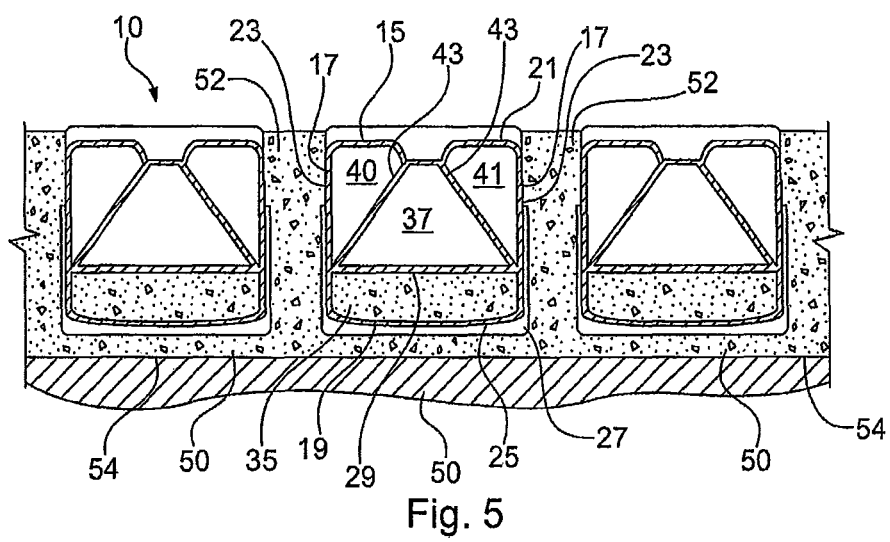
FIG. 5 is an enlarged cross-sectional view of a plurality of filter blocks shown in FIG. 1, showing the filter blocks installed.

Referring to FIGS. 4 and 5, during the installation process, the block 10 is secured in place by grout 50, 52 which flows into the grout chamber 35 through the openings 45, 47 in the side walls 17 and bottom wall 19. The grout 50, 52 also flows around the grout chamber 35 and block 10 up toward the top of the side walls 17 of the block 10.

In one embodiment, the underdrain filter block 10 is installed as generally shown in FIGS. 4 and 5. In particular, as shown in FIG. 4, the block 10 is positioned or set in leveling grout 50 provided on a filter floor 54. The leveling grout 50 protrudes into the grout chamber 35 slightly via the openings 45 in the bottom wall 19. Once the leveling grout 50 has set up enough, the side grout 52 is applied. During the installation of the side grout 52, the grout chamber 35 on the lower portion 33 of the block 10 is at least partially filled with grout. As shown in FIG. 5, the entire grout chamber 35 may be filled with grout after installation. The protrusion of the grout from the openings 45, 47 in the grout chamber 35 holds the block 10 securely in place, thereby overcoming the buoyant forces acting on the block 10. Furthermore, the underdrain filter block 10, particularly the bottom wall 19 of the block 10, is stiffened by the grout 50, 52 that enters the grout chamber 35. The stiffening of the bottom wall 19 and the block 10 reduces deflection or deformation of the block 10 due to the internal pressure. Thus, the grout chamber 35 and openings 45, 47 prevent uplift failure due to the internal pressure caused by headloss through the block 10 and securely hold the filter block 10 on the filter floor 54. In a further embodiment, the filter block 10 is installed by securely holding the block 10 with top and bottom supports (not shown) and installing grout between the bottom wall 19 of the block 10 and the filter floor 54 and along the side walls 17 of the block 10 within a short time frame.

Figure 6:
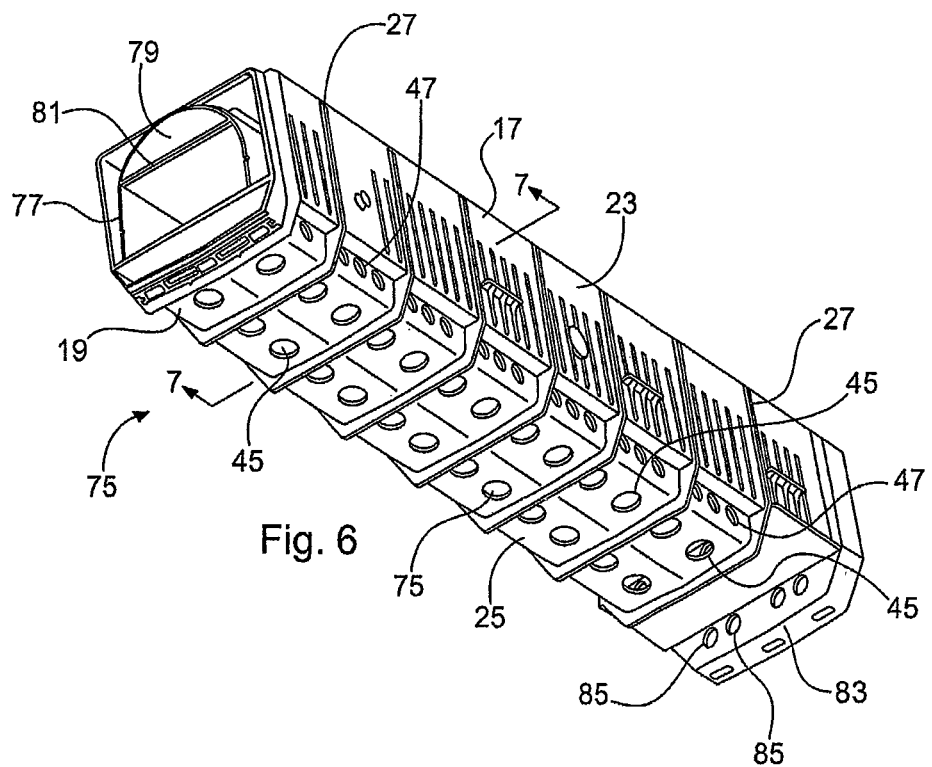
FIG. 6 is a perspective view of an underdrain filter block according to a second embodiment of the present invention.
Figure 7:
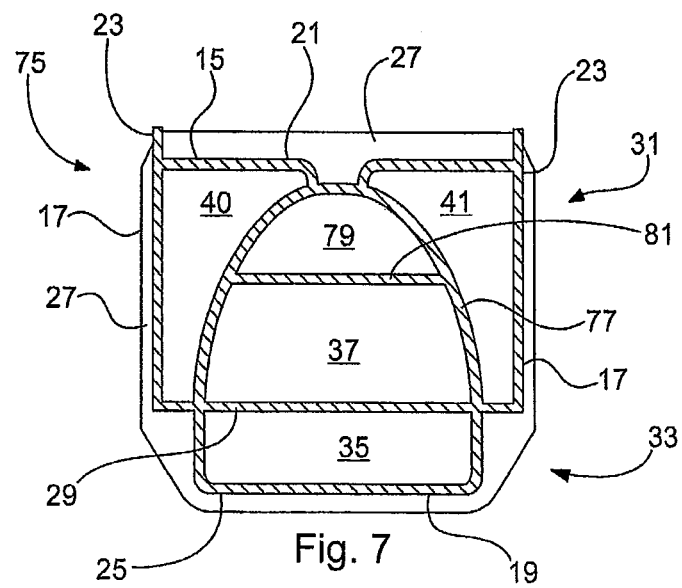
FIG. 7 is an enlarged cross-sectional view of the filter block along the line 7-7 shown in FIG. 6.

Referring to FIGS. 6 and 7, an underdrain filter block 75 according to a second embodiment is shown. The underdrain filter block 75 is similar to the underdrain block 10 as shown in FIGS. 1-5 and discussed above. Like reference numerals are used for like parts. The underdrain block 75 of the present embodiment also includes a top wall 15, a pair of side walls 17, and a bottom wall 19, which define a top surface 21, side surfaces 23, and a bottom surface 25, respectively. The block includes a plurality of reinforcing ribs 27 on the exterior surface of the top wall 15, side walls 17, and bottom wall 19. The ribs 27 generally extend circumferentially around the block with the ribs 27 on the top wall 15 being discontinuous as they extend from the top wall 15 to the side wall 17. The ribs 27, however, extend continuously from the side walls 17 to the bottom wall 19. A transverse wall 29 extends from one side wall 17 to the other side wall 17 to divide the interior of block 75 into an upper portion 31 and a lower portion 33. The lower portion 33 of the block 75 includes a grout chamber 35 defined by the transverse wall 29, side walls 17, and bottom wall 19. The grout chamber 35 only extends a portion of the full length of the block 75. Further, each of the side walls 17 are recessed inwardly where the transverse wall begins. Thus, the grout chamber 35 is recessed compared to the outermost portion of the side walls 17.

Referring again to FIGS. 6 and 7, the upper portion 31 of the block 75 includes a primary chamber 37 and a pair of secondary chambers 40, 41 defined by an interior arched wall 77 extending from the transverse wall 29 and connecting to the top wall 15. A gas conduit 79 is defined by the arched wall 77 and a second transverse wall 81. The top wall 15, arched wall 77, and second transverse wall 81 define a plurality of orifices (not shown) to provide for the distribution of liquid and gas. The bottom wall 19 of the filter block 10 defines a plurality of openings 45 that extend into the grout chamber 35. The side walls 17 also define a plurality of openings 47 in the lower portion 33 of the block 75 with the openings 47 extending into the grout chamber 35. As shown in FIG. 6, the block 75 includes an end connector portion 83 that defines a plurality of openings 85. The openings 85 extend through the end connector portion 83 in a direction that is parallel to a longitudinal axis of the block 75. The end connector portion 83 may be utilized to secure a plurality of blocks 75 end-to-end as discussed above in connection with the block 10 shown in FIGS. 1-5. The block 75 may be installed in a similar manner as described above in connection with the block 10 shown in FIGS. 1-5.

Figure 8:
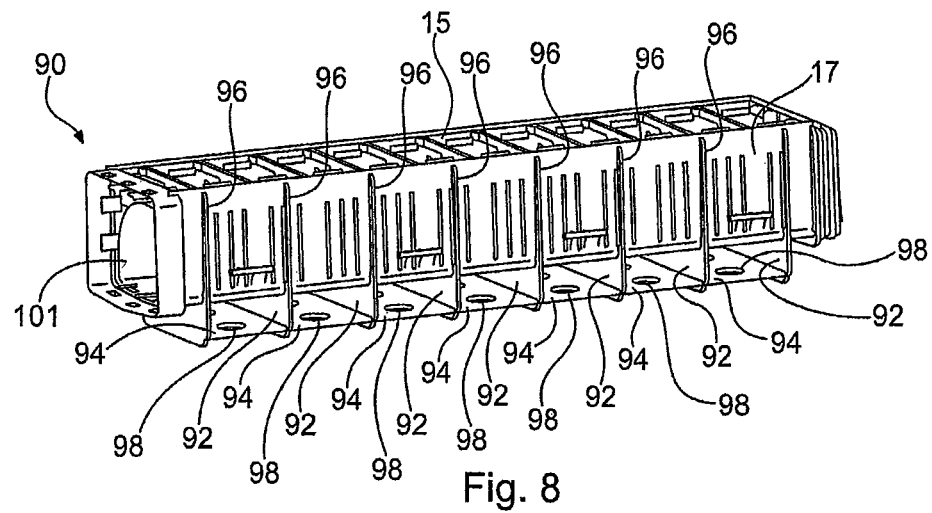
FIG. 8 is a perspective view of an underdrain filter block according to a third embodiment of the present invention.

Referring to FIG. 8, an underdrain filter block 90 according to a third embodiment is shown. The underdrain filter block 90 is similar to the underdrain block 10 as shown in FIGS. 1-5 and discussed above. Like reference numerals are used for like parts. The underdrain filter block 90 includes a plurality of grout chambers 92 defined by wall segments 94 positioned between ribs 96 that extend from a bottom surface of the block 90. The wall segments 94 extend longitudinally between the ribs 96. Thus, the grout chambers 92 are defined by the ribs 96 and the wall segments 94. The wall segments 94 each define a plurality of openings 98 for receiving grout as discussed above in connection with the openings 45 of the underdrain filter block 10 shown in FIGS. 1-5. The interior 101 of the block 90 may be similar to the upper portions 31 of the underdrain filter blocks 10, 75 discussed above having angularly extending walls or an arched wall to define primary and secondary conduits. The block 90 may be installed in a similar manner as described above in connection with the block 10 shown in FIGS. 1-5 with the open sides of the grout chambers 92 receiving grout rather than the openings 47 of the block 10.

Figure 9:
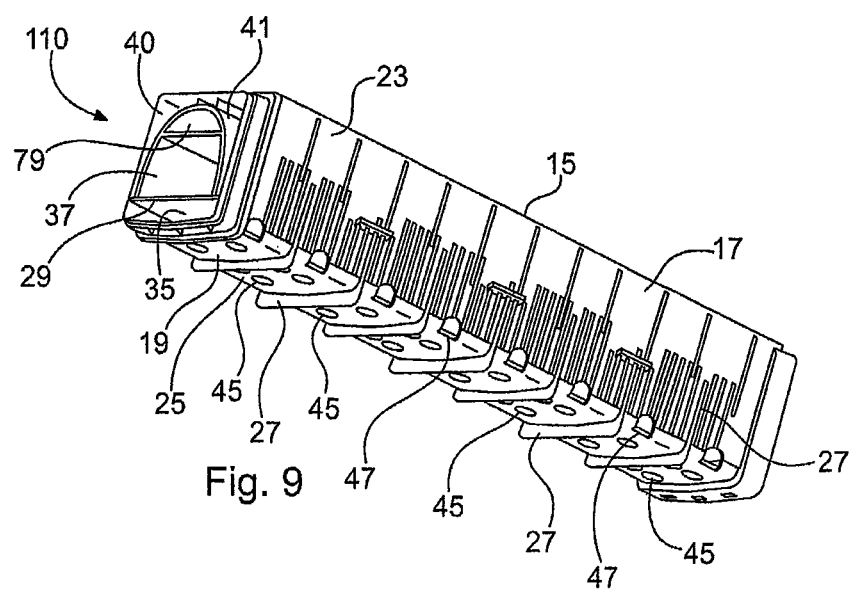
FIG. 9 is a perspective view of an underdrain filter block according to a fourth embodiment of the present invention.

Referring to FIG. 9, an underdrain filter block 110 according to a fourth embodiment is shown. The underdrain filter block 110 is similar to the underdrain block 10 as shown in FIGS. 1-5 and discussed above. Like reference numerals are used for like parts. The underdrain filter block 110 includes openings 45 in a bottom wall 19 and openings 47 in each of the side walls 17 similarly to the underdrain filter block 10 of FIGS. 1-5. The openings 47 of the underdrain filter block 110, however, are positioned at a location where the side walls 17 join the bottom wall 19 such that the openings 47 are non-circular. In particular, the openings 47 of the underdrain filter block 110 have an upper circular portion with a generally-planar bottom portion. The block 110 may be installed in a similar manner as described above in connection with the block 10 shown in FIGS. 1-5.

Figure 10:
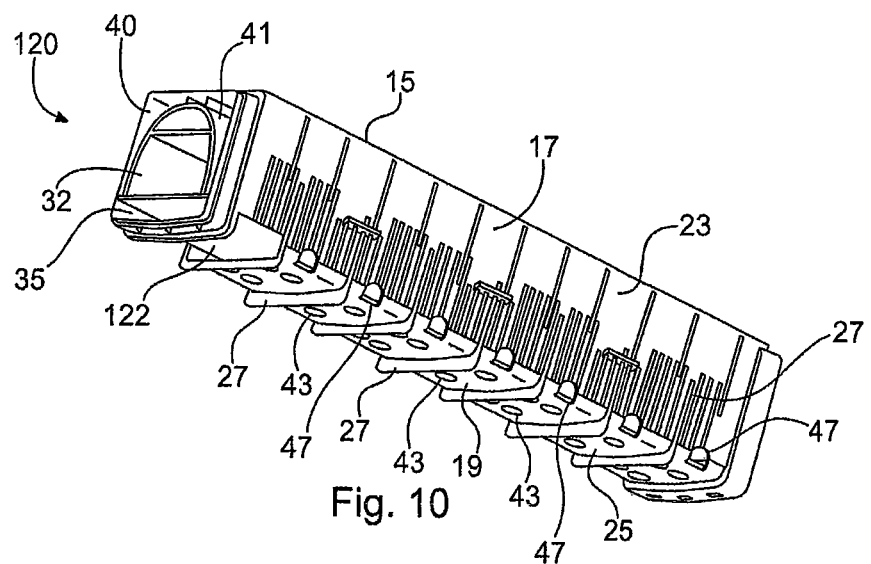
FIG. 10 is a perspective view of an underdrain filter block according to a fifth embodiment of the present invention.

Referring to FIG. 10, an underdrain filter block 120 according to a fifth embodiment is shown. The underdrain filter block 120 is similar to the underdrain block 10 as shown in FIGS. 1-5 and discussed above. Like reference numerals are used for like parts. The underdrain filter block 120 includes a grout chamber 35 that does not extend the full length of the block 120 thereby defining a cutout 122 adjacent to an end of the block 120. The openings 47 in the side walls 17 of the underdrain filter block 120 are similar to those described above in connection with the underdrain filter block 110 shown in FIG. 9. The cutout 122 is configured to receive a support structure (not shown). For example, the cutout 122 may receive a uni-strut. The block 120 may be installed in a similar manner as described above in connection with the block 10 shown in FIGS. 1-5.

Figure 11:
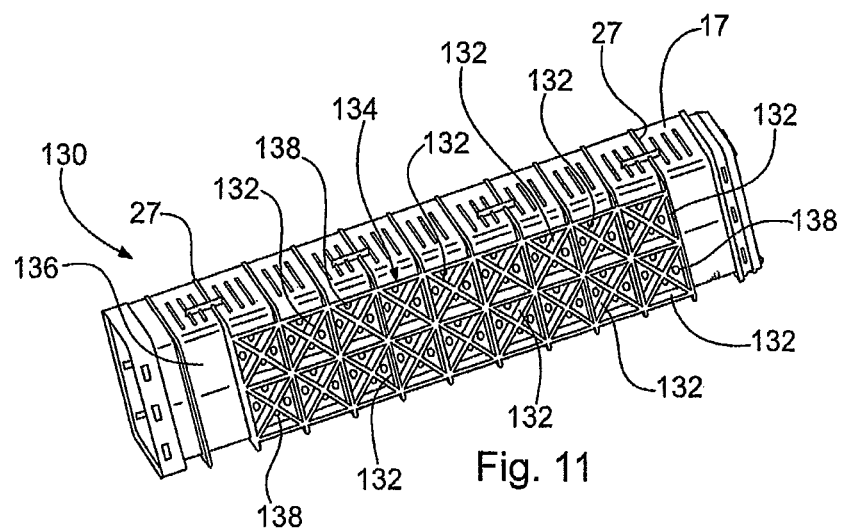
FIG. 11 is a perspective view of an underdrain filter block according to a sixth embodiment of the present invention.

Referring to FIG. 11, an underdrain filter block 130 according to a sixth embodiment is shown. The underdrain filter block 130 is similar to the underdrain block 10 as shown in FIGS. 1-5 and discussed above. Like reference numerals are used for like parts. The underdrain filter block 130 includes a plurality of grout chambers 132 defined by a grid-like structure 134 positioned on a bottom surface 136 of the underdrain filter block 130. The bottom surface 136 of the block 130 defines a plurality of air relief openings 138 that extend into each of the grout chambers 132. The grid-like structure 134 strengthens the block 130 to limit deflection or deformation of the bottom surface 136. Further, the grout chambers 132 each receive grout in a similar manner as described above in connection with the grout chamber 35 of the underdrain filter block 10 shown in FIGS. 1-5. The air relief openings 138 allow air to evacuate to ensure that the grout chambers 132 fill with grout, which further stiffens and strengthens the block 130. The block 130 may be installed in a similar manner as described above in connection with the block 10 shown in FIGS. 1-5.

Figure 12:
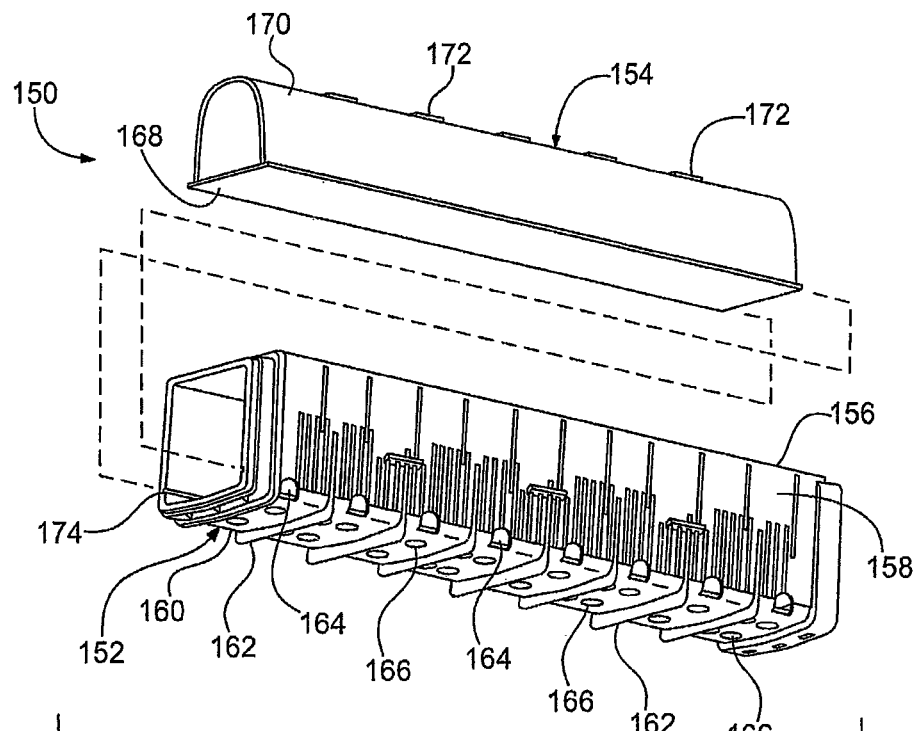
FIG. 12 is an exploded perspective view of an underdrain filter block according to a seventh embodiment of the present invention.

Referring to FIG. 12, an underdrain filter block 150 according to a seventh embodiment is shown. The underdrain filter block 150 is similar to the underdrain block 110 shown in FIG. 9. The filter block 150 is formed from separate first and second pieces 152, 154. The first piece 152 has a rectangle-shaped body formed by a top wall 156, side walls 158, and a bottom wall 160 with ribs 162 extending in a circumferential direction around the first piece 152. The first piece 152 has a hollow interior and includes openings 164, 166 defined by the side walls 158, and bottom wall 160. The second piece 154 defines interior walls including a transverse wall 168 and an arched wall 170. As shown in FIG. 12, the transverse wall forms a continuous imperforate barrier between the upper portion and the grout chamber when installed between the side walls 158. The arched wall 170 is secured to the transverse wall 168. Although not shown, the, second piece 154 (particularly, the arched wall 170) may include orifices for the flow of fluids as generally known in the art. The first and second pieces 152, 154 are formed integrally as single, unitary structures, although the first and second pieces 152, 154 may also be individually assembled from multiple pieces.

As shown in FIG. 12, the underdrain filter block 150 is assembled by inserting the second piece 154 into the first piece 152 with outer edges of the transverse wall 168 engaging groves 174 defined by the inner surface of the side walls 158. The second piece 154 is further secured to the first piece 152 via fasteners (not shown) that extend through the top wall 156 of the first piece 152 and engage bosses 172 on the top of the arched wall 170 of the second piece 154. After the first and second pieces 152, 154 are assembled, the transverse wall 168 of the second piece 154, the bottom of the side walls 158, and the bottom wall 160 define a grout chamber as discussed above, for example, in connection with the underdrain filter block 10 shown in FIGS. 1-5. The transverse wall 168 and the arched wall 170 of the second piece 154 define a primary conduit. Similarly, the first piece 152, the transverse wall 168, and the arched wall 170 define secondary conduits.

Figure 13:
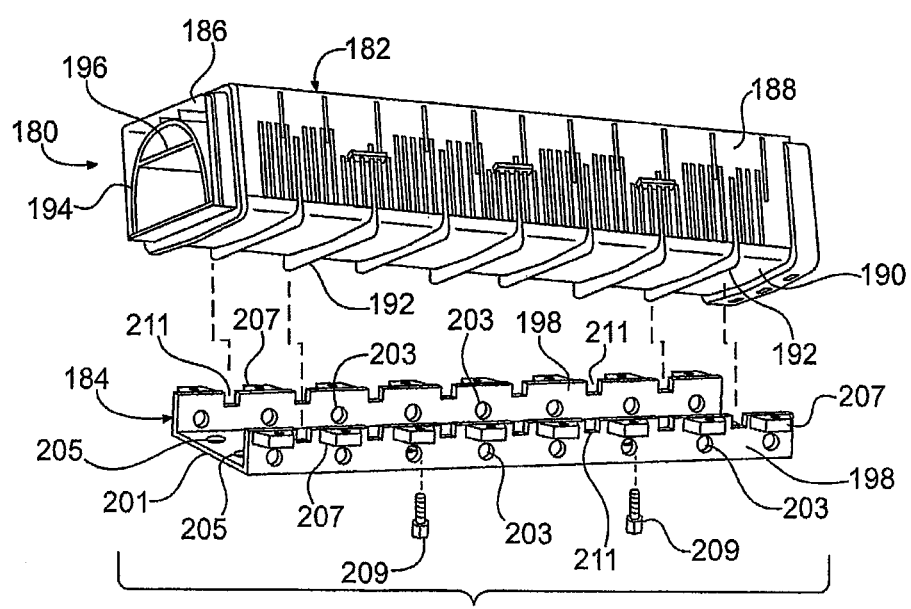
FIG. 13 is an exploded perspective view of an underdrain filter block according to an eight embodiment of the present invention.

Referring to FIG. 13, an underdrain filter block 180 according to an eighth embodiment is shown. The underdrain filter block 180 is similar to the underdrain block shown in FIGS. 6 and 7. The underdrain filter block 180, however, is formed from separate first and second pieces 182, 184 to define a grout chamber. The first piece 182 has a rectangle-shaped body formed by a top wall 186, side walls 188, and a bottom wall 190. The first piece 182 includes ribs 192 that extend in a circumferential direction around the first piece 182. The first piece 182 also includes an interior arched wall 194 and an interior transverse wall 196 to define primary and secondary conduits. The second piece 184 includes a pair of rectangle-shaped side walls 198 secured to a rectangle-shaped bottom wall 201. The second piece 184 defines openings 203 in the side walls 198 and openings 205 in the bottom wall 201.

As shown in FIG. 13, the underdrain filter block 180 is assembled by attaching the second piece 184 to the first piece 182. More specifically, the second piece 184 includes bosses 207 on the side wall 198 and is secured to the bottom wall 190 of the first piece 182 via fasteners 209 that extend through the bosses 207. The side walls 198 of the second piece 184 define notches 211 to receive the ribs 192 of the first piece 182. The bottom wall 190 of the first piece 182 may be pre-drilled or self-tapping fasteners may be utilized. After the first and second pieces 182, 184 are assembled, the bottom wall 190 of the first piece 182, the side walls 198 of the second piece 184, and the bottom wall 201 of the second piece 184 define a grout chamber as discussed above, for example, in connection with the underdrain filter block 10 shown in FIGS. 1-5. The first piece 182 defines primary and secondary conduits as discussed above in connection with the underdrain filter block 75 shown in FIGS. 6 and 7.

Figure 14:
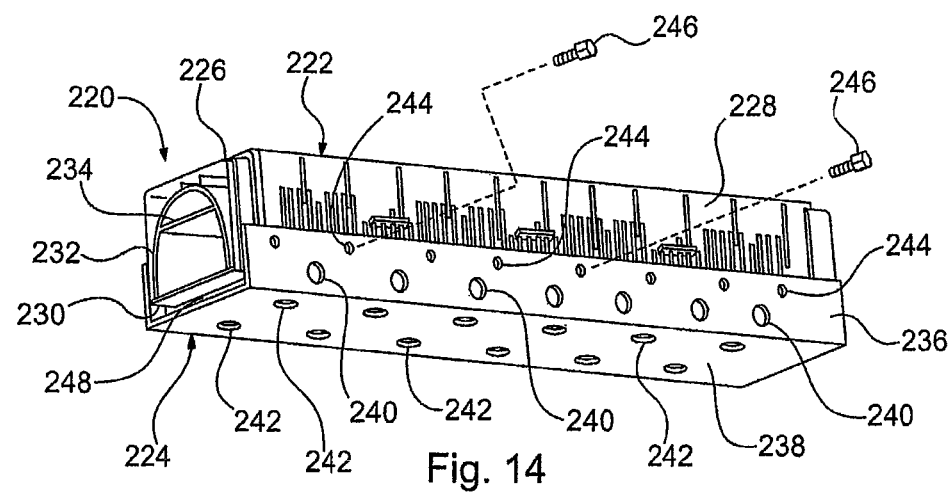
FIG. 14 is a perspective view of an underdrain filter block according to a ninth embodiment of the present invention.

Referring to FIG. 14, an underdrain filter block 220 according to a ninth embodiment is shown. The underdrain filter block 220 is similar to the underdrain block 180 shown in FIG. 13. The underdrain block 220 is formed from separate first and second pieces 222, 224 to define a grout chamber. The first piece 222 has a rectangle-shaped body formed by a top wall 226, side walls 228, and a bottom wall 230. The first piece 222 includes an interior arched wall 232 and an interior traverse wall 234 to define primary and secondary conduits. The second piece 224 includes a pair of rectangle-shaped side walls 236 secured to a rectangle-shaped bottom wall 238. The second piece defines openings 240 in the side walls 236 and openings 242 in the bottom wall 238.

As shown in FIG. 14, the underdrain filter block 220 is assembled by inserting the second piece 224 into the first piece 222 and attaching the second piece 224 to the first piece 222. More specifically, the second piece 224 includes fastener holes 244 in the side walls 236 and is secured to the side walls 228 of the first piece 222 via fasteners 246 that extend though the sidewall 228, 236 of the first and second pieces 222, 224. After the first and second pieces 222, 224 are assembled, the bottom wall 230 of the first piece 222, the side walls 236 of the second piece 224, and the bottom wall 238 of the second piece 224 define a grout chamber as discussed above, for example, in connection with the underdrain filter block 10 shown in FIGS. 1-5. The first piece 222 defines primary and secondary conduits as discussed above in connection with the underdrain filter block 75 shown in FIGS. 6 and 7.

Figure 15:
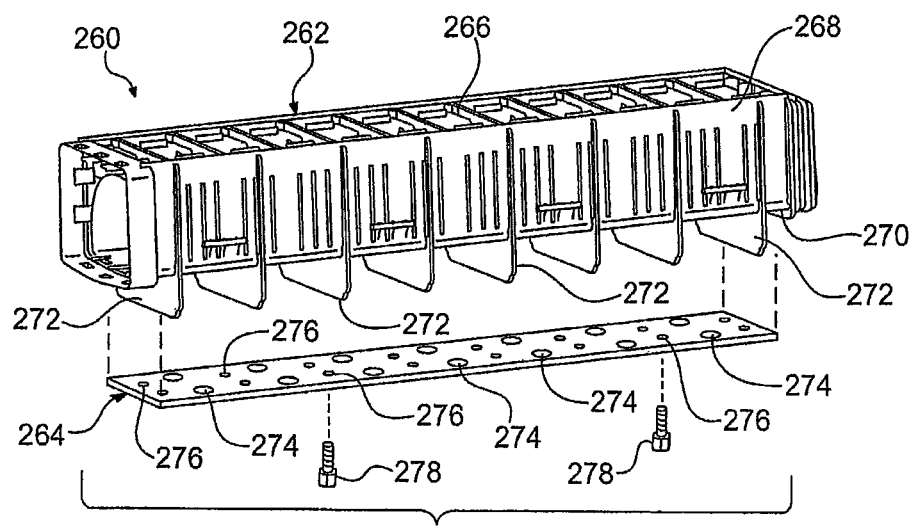
FIG. 15 is an exploded perspective view of an underdrain filter block according to a tenth embodiment of the present invention.

Referring to FIG. 15, an underdrain filter block 260 according to a tenth embodiment is shown. The underdrain filter block 260 is similar to the underdrain block 90 shown in FIG. 8. The underdrain filter block 260 is formed from separate first and second pieces 262, 264 to define a plurality of grout chambers, which are discussed above in connection with the block 90 shown in FIG. 8. The first piece 262 is generally rectangle-shaped and is defined by a top wall 266, side walls 268, and a bottom wall 270. The first piece 262 includes ribs 272 that extend in a circumferential direction around the first piece 262 and also extend from the bottom wall 270. The second piece 264 is a plate-like, rectangle-shaped body defining a plurality of openings 274 and a plurality of fastener holes 276. As shown in FIG. 15, the underdrain filter block 260 is assembled by securing the second piece 264 to the bottom of the ribs 272 of the first piece 262 via fasteners 278. After the first and second pieces 262, 264 are assembled, the bottom wall 270 of the first piece 262, the ribs 272, and the second piece 264 define a plurality of grout chambers as discussed above, for example, in connection with the underdrain filter block 90 shown in FIG. 8.

This invention has been described with reference to the preferred embodiments. Obvious modifications and alterations will occur to others upon reading and understanding the preceding detailed description. It is intended that the invention be construed as including all such modifications and alterations.

The invention claimed is:

1. An underdrain filter block for use in draining and backwashing a filtering media in a filter bed, the block comprising:
    a top wall;
    a pair of side walls extending from the top wall;
    a bottom wall extending between the pair of side walls; and
    a transverse wall extending from one of the pair of side walls to the other of the pair of side walls,
    wherein the top wall, the pair of side walls, and the transverse wall define an upper portion, wherein the pair of side walls, the transverse wall, and the bottom wall a lower portion, including a grout chamber positioned between the bottom wall and the transverse wall, wherein at least one of the bottom wall and said side walls contains an opening, and wherein the transverse wall forms a continuous imperforate barrier between the upper portion and the grout chamber;
    wherein the top wall, the bottom wall, and the pair of side walls are defined by a first piece and the transverse wall is defined by a second piece; and
    wherein side portions of the transverse wall are received by grooves defined by inner surfaces of each of the pair of side walls.

2. The underdrain filter block of claim 1, wherein the bottom wall and the pair of side walls define a plurality of openings in the lower portion.

3. The underdrain filter block of claim 1, further comprising a plurality of ribs generally extending circumferentially along the pair of side walls and the bottom wall.

4. The underdrain filter block of claim 1, wherein the grout chamber extends the full length of the underdrain filter block.

5. The underdrain filter block of claim 1, wherein the upper portion includes a primary chamber and at least one secondary chamber defined by an arched wall.

6. The underdrain filter block of claim 1, wherein the bottom wall includes a plurality of openings that are circular-shaped.

7. The underdrain filter block of claim 1, wherein the second piece comprises a plurality of bosses each configured to receive a fastener.

8. The underdrain filter block of claim 1, wherein the upper portion includes a primary chamber and at least one secondary chamber defined by an arched wall, and wherein the transverse wall and arched wall are defined by the second piece.

9. The underdrain filter block of claim 8, wherein the arched wall comprises a plurality of bosses each configured to receive a fastener.

* * * * *